United States Patent

Flanagan et al.

[15] 3,675,513

[45] July 11, 1972

[54] COMMUNICATIONS SYSTEM FOR ALPHANUMERIC INFORMATION EMPLOYING AUDIO TONE SIGNALLING

[72] Inventors: James Loton Flanagan, Warren; James Hughes Kronmeyer, Jersey City; John Richard Nelson, Somerville, all of N.J.

[73] Assignee: Bell Telephone Laboratories, Incorporated, Murray Hill, Berkeley Heights, N.J.

[22] Filed: July 24, 1970

[21] Appl. No.: 58,074

[52] U.S. Cl. ........................................179/84 VF, 179/2 DP

[51] Int. Cl. ........................................H04m 11/00

[58] Field of Search .....................178/25, 26 R, 26 A, 77, 78, 178/80, 81; 179/2 DP, 15 MM, 4, 2 C, 1 C, 84 UF; 340/336, 337, 349, 354, 171 R, 171 A, 171 PF

[56] References Cited

UNITED STATES PATENTS

| | | | |
|---|---|---|---|
| 3,472,965 | 10/1969 | Blossom | 340/171 R |
| 3,581,283 | 5/1971 | Reddel | 179/84 UF |
| 3,405,234 | 10/1968 | West | 340/171 R |
| 3,582,554 | 6/1971 | Le Blang | 179/84 UF |
| 3,381,276 | 4/1968 | James | 179/2 DP |
| 2,073,333 | 3/1937 | Chireix | 178/25 |
| 3,557,311 | 1/1971 | Goldstein | 179/2 DP |
| 3,536,839 | 10/1970 | Prins | 179/2 DP |
| 3,213,441 | 10/1965 | Shook | 340/336 |
| 2,200,807 | 4/1940 | Potts | 340/354 |
| 3,292,178 | 12/1966 | Magnuski | 179/15 BM |
| 2,645,771 | 7/1953 | Labin | 179/15 BM |

*Primary Examiner*—Kathleen H. Claffy
*Assistant Examiner*—David L. Stewart
*Attorney*—Guenther: R. J. and William L. Keefauver

[57] ABSTRACT

A communications system for exchanging alphanumeric information between remote stations, employing station apparatus (e.g., modified typewriters) capable of generating and responding to an audio tone code. The system is compatible with use of a push-button telephone instrument as an alternative sending station.

11 Claims, 12 Drawing Figures

INVENTORS J. L. FLANAGAN
J. H. KRONMEYER
J. R. NELSON

BY Howard E. Murphy
ATTORNEY

FIG. 2

| ALPHANUMERIC CHARACTER | CODING SEQUENCE | |
|---|---|---|
| 1 | 1 | |
| 2 | 2 | |
| 3 | 3 | |
| 4 | 4 | |
| 5 | 5 | NUMERIC MODE |
| 6 | 6 | |
| 7 | 7 | |
| 8 | 8 | |
| 9 | 9 | |
| 0 | 0 | |
| Q | 1-0 | |
| Z | 1-1-0 | |
| • (PERIOD) | 1-1-1-0 | |
| A | 2-0 | |
| B | 2-2-0 | |
| C | 2-2-2-0 | |
| D | 3-0 | |
| E | 3-3-0 | |
| F | 3-3-3-0 | |
| G | 4-0 | |
| H | 4-4-0 | |
| I | 4-4-4-0 | |
| J | 5-0 | |
| K | 5-5-0 | |
| L | 5-5-5-0 | |
| M | 6-0 | |
| N | 6-6-0 | ALPHABETIC MODE |
| O | 6-6-6-0 | |
| P | 7-0 | |
| R | 7-7-0 | |
| S | 7-7-7-0 | |
| T | 8-0 | |
| U | 8-8-0 | |
| V | 8-8-8-0 | |
| W | 9-0 | |
| X | 9-9-0 | |
| Y | 9-9-9-0 | |
| (CARRIAGE RETURN) | *-0 | |
| (ALPHABETIC MODE) | *-*-* [SPECIAL] | |
| (SPACE) | #-0 | |
| (NUMERIC MODE) | #-#-# [SPECIAL] | |

COMMUNICATIONS SYSTEM FOR ALPHANUMERIC INFORMATION EMPLOYING AUDIO TONE SIGNALLING

BACKGROUND OF THE INVENTION

1. Field of the Invention

This invention relates to communications systems for exchanging alphanumeric information between remote stations and more particularly to a communications system with the capabilities of a teletypewriter system wherein the signalling employed is such that an ordinary push-button telephone instrument may be used as an alternative sending station.

2. Description of the Prior Art

It has long been recognized that the push-button telephone set is a communications instrument of potential application other than for conventional voice communications. It has been suggested that the audio tones generated within such a telephone instrument be used as a means for remote computer access (see, for example, "A Pushbutton Telephone for Alphanumeric Input," Leon Davidson, Datamation, Vol. 12, No. 4, April, 1966, p. 27 et seq.). Others have proposed augmenting the telephone instrument with alphanumeric visual display apparatus responsive to alphanumeric information transmitted from the dial of another push-button telephone to provide an entirely visual mode of telephone communication (see, for example, "Ring Two — For Tomorrow", M. W. Nabut, Electronics World, Vol. 79, No. 2, Feb. 1968, p. 46 et seq.). All of these proposals seek to take advantage of the presently wide and potentially universal use of push-button telephone instruments. When, in the not too distant future, push-button telephone sets become standard telephone equipment, they will be widely available potential coding and sending stations for alphanumeric data and information.

Perhaps the most obvious deficiency of the push-button telephone "dial" as a coding device is the fact that for any information other than strictly numeric information the user of the device must learn and use a code more complicated than the simple one-for-one coding employed for sending numbers (e.g., telephone numbers). Even the simplest of alphanumeric coding schemes requires the sequential depressions of two or more buttons to code any character other than a number. In addition, since the message must be transmitted character by character by the manual operation of the telephone push-buttons, considerable time is required when messages of substantial length are to be sent.

In any scheme for communication by push-button telephone dial coding, apparatus for the decoding and display of transmitted information must be attached to the receiving station. Unless, however, that apparatus is capable of making a permanent record of information received, the receiving station must be attended by a person capable of receiving the message. Similarly, unless recording apparatus is attached to the sender's telephone, he has no way of verifying or recording information transmitted.

Quite obviously, the needs of the several users of a communications system such as this will vary. Some users may require rapid communication of fairly lengthy messages between fixed locations. For these users, a requirement of extra equipment at each of the fixed locations is no hardship, albeit cost is an important consideration. Others may require the input to a fixed location of relatively short messages from many, constantly changing locations. For these, extra equipment at the central location is not a problem if unadorned telephone apparatus can be used at the remote locations. Still other users may require a communications system employing a combination of the above features. Even the needs of a given user may change from time to time, there being a need at some times for a rapid, efficient means of transmitting long messages between fixed locations, while at other times short messages must be transmitted from changing locations.

Accordingly, there exists a need for an alphanumeric communications system with the flexibility to meet the requirements of a wide variety of users; one which can take advantage of the general availability of the telephone network and telephone equipment for shorter messages but which is also compatible with and can be upgraded to an efficient teletypewriter communications system suitable for transmission of longer messages between relatively fixed locations.

It is therefore an object of this invention to provide a flexible system for communicating alphanumeric information.

It is a more particular object of this invention to provide apparatus for sending and receiving messages transmitted in an audio tone code compatible with use of a push-button telephone as an alternative sending station.

Another object of this invention is to provide a typewriter-to-typewriter communications system employing audio tone signalling.

Yet another object of this invention is to provide a typewriter-to-typewriter communications system employing an audio tone code compatible with use of a push-button telephone as an alternative sending station.

A further object of this invention is to provide an inexpensive teletypewriter communications system.

SUMMARY OF THE INVENTION

These and other objects of this invention are accomplished, in accordance with the principles of this invention, by providing apparatus for automatically coding messages, typed on the keyboard of a modified typewriter, in an audio tone code which can alternatively be generated using the dial of a standard 12-button, push-button telephone set. More particularly, each of the keys of a sending typewriter is equipped with a microswitch which is operated when the attached typewriter key is depressed. Operation of any of these microswitches triggers apparatus which selects the audio tones associated with the typed typewriter function and pulses the selected tones in a manner appropriate to the coding of that function.

At a receiving station the audio tones are identified and the pulses counted by decoding apparatus, also constructed in accordance with the principles of this invention, in order to determine which typewriter function is being received. If the receiving station includes a typewriter, the identified function is implemented on that typewriter by activation of a solenoid which pecks at or depresses the appropriate typewriter key. Alternatively, the receiving station may include any of several other types of visual display apparatus similarly activated by the decoding device.

The audio tones chosen for this system are compatible with those used in standard push-button telephone systems. In addition, the code employed may be easily implemented by means of manual operation of a push-button telephone dial. Finally, the decoding apparatus is such that synchronization of sending and receiving apparatus is not required and timing is not material. Thus, information sent from either a sending typewriter or a push-button telephone can be decoded equally well.

Further features and objects of this invention, its nature, and various advantages, will be more apparent upon consideration of the attached drawings and the following detailed description.

BRIEF DESCRIPTION OF THE DRAWING

FIG. 2 is a coding scheme for use with the system of FIG. 1;

DETAILED DESCRIPTION OF THE INVENTION

Figure 1:
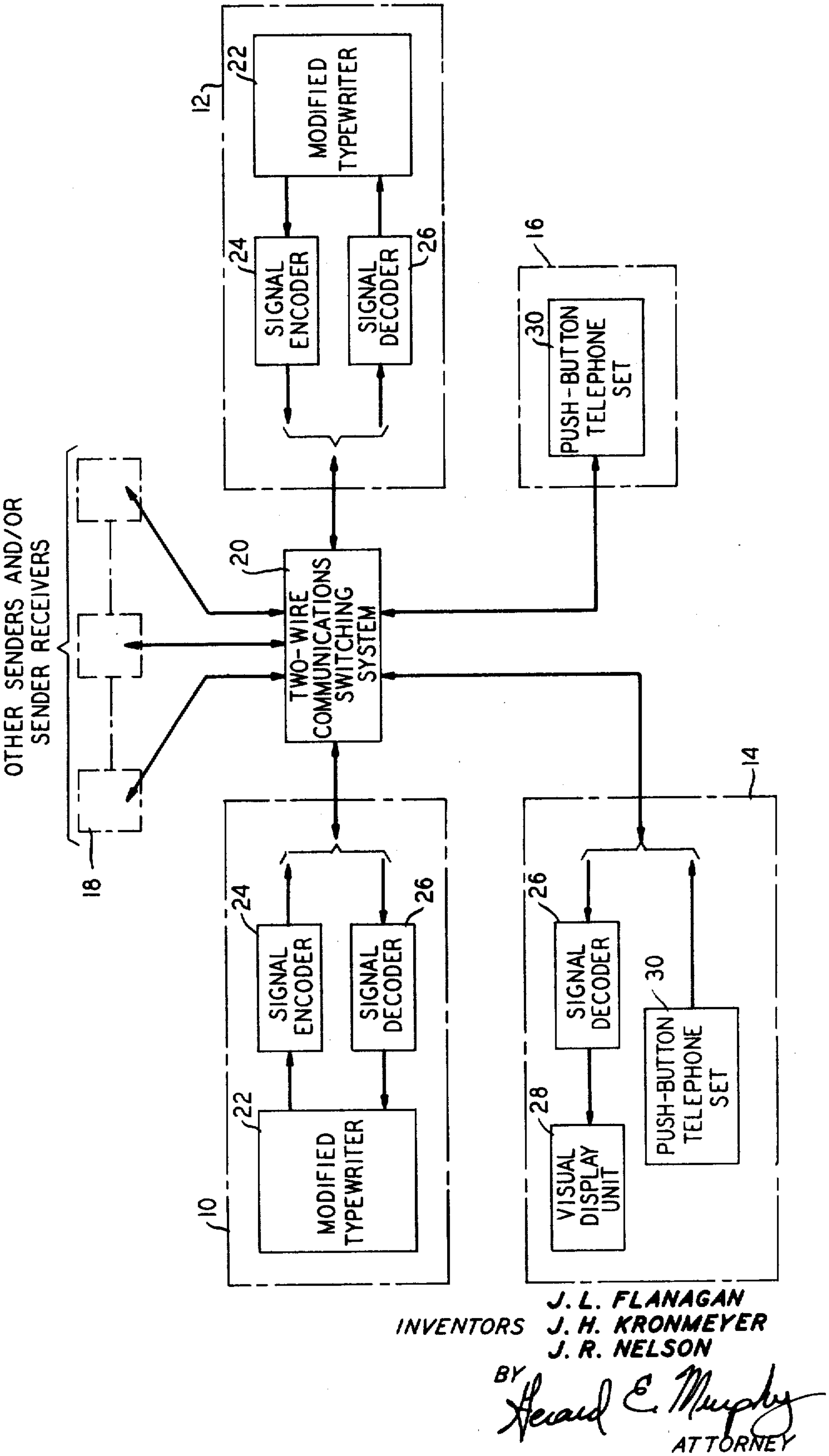
FIG. 1 is a block diagram of the communications system of this invention showing the various kinds of apparatus which may be compatibly interconnected.

As is now well known, the depression of any given button on the dial of a standard 12-button, push-button telephone instrument causes the instrument to generate one of 12 pairs of audio tones whereby the button depressed may be identified. The 12 distinctive tone pairs are combinations of seven audio tones, each pair comprising one tone from a low range of frequencies (i.e., 697 Hz., 770 Hz., 852 Hz., or 941 Hz.) and one tone from a high range (i.e., 1209 Hz., 1336 Hz., or 1477 Hz.). As is also familiar, the 12 buttons on such a dial are marked 1 through 9, 0, *, and # . In addition, the letters of the alphabet, with the exception of Q and Z, are associated in groups of three with buttons 2 through 9 by additional markings on the dial.

An easily remembered alphanumeric code which takes advantage of the customary arrangement of and markings on the standard push-button telephone dial is shown in FIG. 2. Two coding modes are employed to subdivide the character set and to simplify coding. In the first or "numeric" mode, the ten digits (i.e., 1 through 9 and 0) are coded just as any digit in a numeric telephone number is customarily coded, i.e., by the momentary depression of the appropriate button. In the second or "alphabetic" mode each of the 26 letters of the alphabet is coded by one, two, or three pushes of an assigned button followed by a single push of a button (i.e., the 0-button) assigned to an "end-of-code" or "print" function. The assignment of buttons to alphabetic characters is such that maximum use is made of the markings universally found on push-button telephone dials. Thus A, the first letter associated with the 2-button, is coded by a single push of the 2-button followed by a single push of the 0-button. Similarly, B and C, the second and third letters associated with the 2-button, are coded by two and three pushes, respectively, of the 2-button followed by a single push of the 0-button. For coding purposes, Q and Z may be assigned the first and second positions on the 1-button.

If this scheme is continued, there remain several unused codes. These are the third position on the 1-button and three positions each on the *-button and the # -button. These may be used for the coding of necessary punctuation marks (e.g., the period and comma), function controls (e.g., typewriter space and carriage return), coding mode control (e.g., numeric or alphabetic), and the like. In addition, as will be discussed below, more coding sequences can be made available if button operations are intermixed. The code illustration in FIG. 2 is therefore a convenient, easily remembered method for coding alphanumeric information on a push-button telephone dial.

FIG. 1 illustrates a highly flexible alphanumeric communications system employing the coding scheme of FIG. 2 which can be constructed, according to the principles of this invention, to utilize the facilities of an ordinary telephone communications network. Particularly desirable is a telephone network in which 12-button, push-button telephone station sets are widely employed. As shown in FIG. 1, several types of communications apparatus may be compatibly connected to any two wire telephone switching system 20 for purposes of alphanumeric communication as described herein. In addition to 12-button, push-button telephone sets 30, any one of which may be used as a send-only station (e.g., station 16), sender-receivers of several kinds may be employed. Apparatus 10, for example, is a sender-receiver comprising a modified typewriter 22, a signal encoder 24, and a signal decoder 26, all arranged as discussed in detail below. Sender-receiver 10 is therefore a communications device with many of the capabilities of the usual teletypewriter terminal. When two such stations (e.g., stations 10 and 12) are connected, communication may take place between them in very much the way teletypewriter communication is usually accomplished, i.e., with coding and decoding being automatic and the users being concerned only with the operation of their respective terminals primarily as typewriters. As will be seen from later discussion, however, these fully automated terminals may be used to receive messages not only from other automated terminals but also from terminals like terminal 16 whereat message coding is done manually.

Alternatively, a less elaborate and less expensive sender-receiver 14 may be constructed using a push-button telephone set, a decoder similar to that required in sender-receivers 10 and 12, and a visual display unit. In a sender-receiver of this type, push-button telephone set 30 is used as a manual coding device while messages are received and decoded automatically by decoder 26 and displayed on visual display unit 28. Visual display unit 28 may be a typewriter similar to typewriters 22 but modified less extensively or, if a permanent record of messages received is not required, display unit 28 may be any alphanumeric character display light tube unit.

The apparatus of this invention is also suitable for remote communication with computer devices. In applications requiring such communication, the computer may be connected to the system of FIG. 1 in any well-known manner. For example, a computer access terminal may be used in lieu of visual display apparatus 28 in sender-receiver station 14.

Attention will now be focused on the details of the construction of each of the components of the system generally described above.

FIGS. 3A through 3D depict a suitable automatic signal encoder, denoted signal encoder 24 in FIG. 1, and show how it may be connected to the keyboard 34 (FIGS. 3A, 3B, and 3C) of a modified typewriter, denoted modified typewriter 22 in FIG. 1. Each of the character and function keys on keyboard 34 is arranged to operate a single-pole, double-throw microswitch as well as the usual typewriter mechanism when it is depressed. These microswitches are arranged so that a first connection (to a vertical lead 35) is maintained while the associated typewriter key is in the normal position and a second connection (to a horizontal bus 37 or 71) is made when the key is fully depressed. These microswitches may be mechanically connected to any convenient part of the key mechanism of the typewriter in a conventional manner.

Figure 3A:
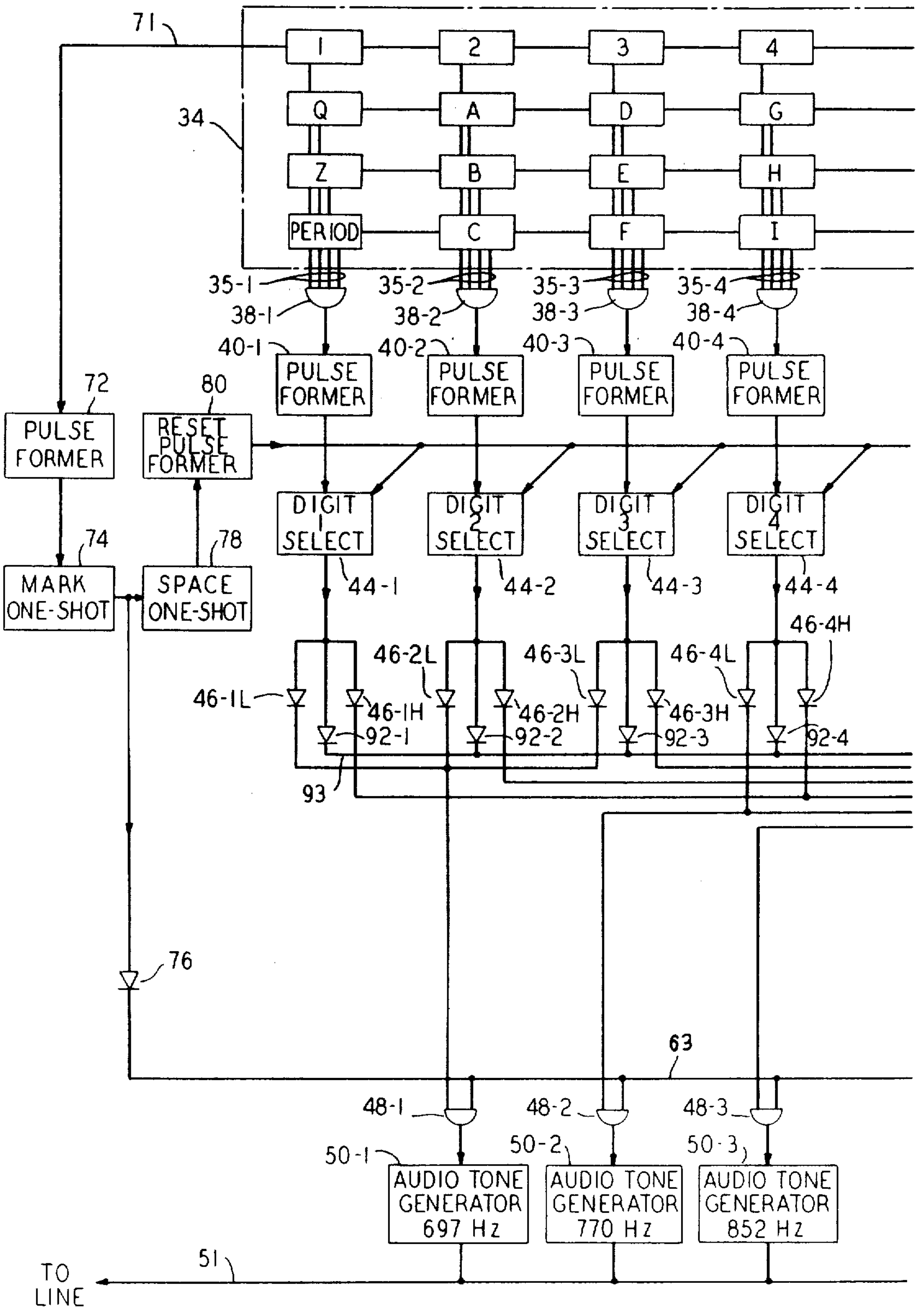
FIGS. 3A through 3D, which are to be read together as shown in FIG. 3E, comprise a schematic diagram of the automatic coding apparatus of this invention.
Figure 3B:
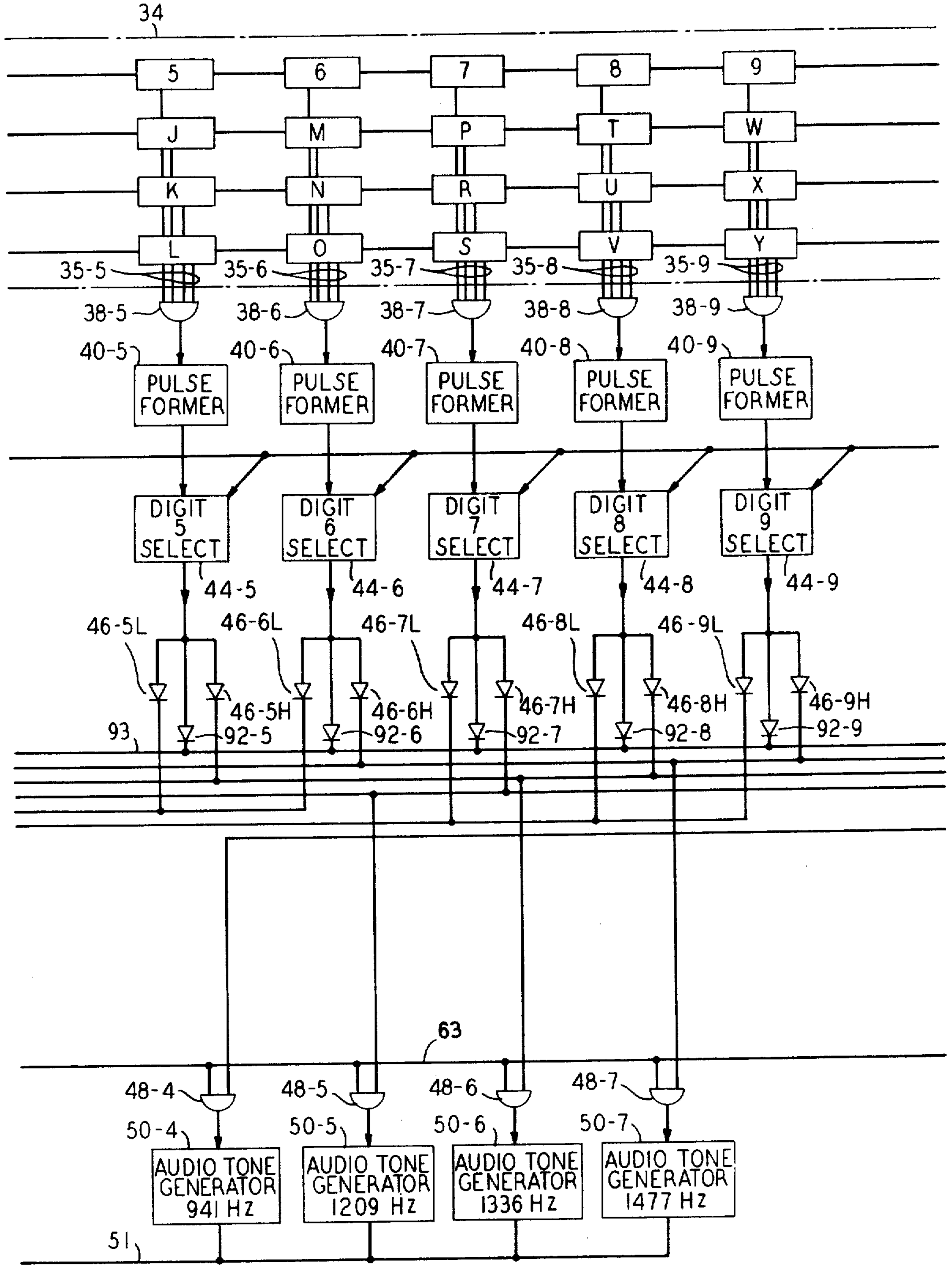
Figure 3C:
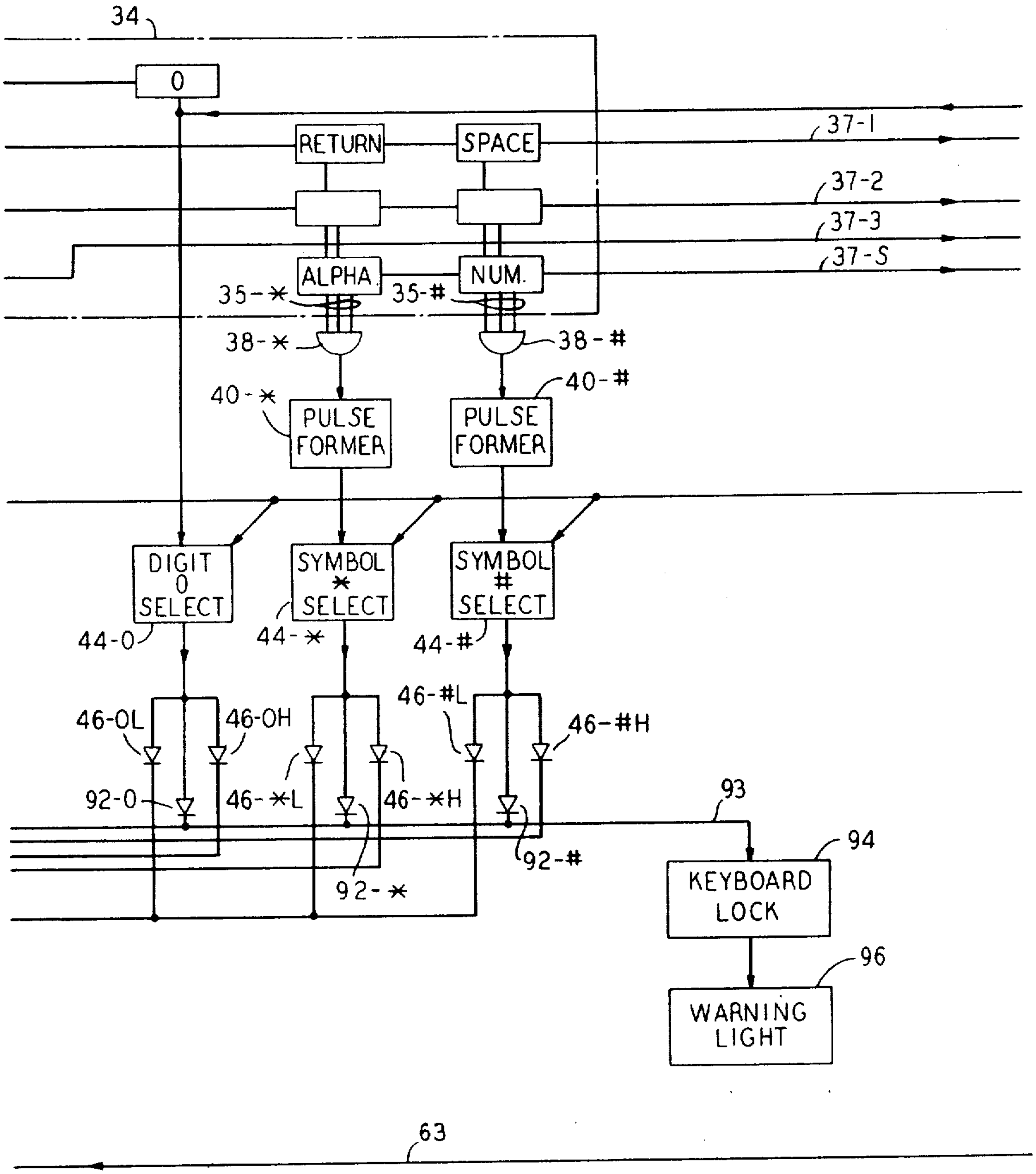

When the typewriter key for any of the typewriter operations or functions coded as shown in FIG. 2 is depressed, the breaking of the so-called first connection in the microswitch for that key changes signal conditions at one of the input terminals of the OR gate 38 (FIGS. 3A, 3B, and 3C) associated with the push-button telephone dial digit or symbol required to code the typed function. This may be accomplished, for example, by having all of the input terminals of the OR gate connected to ground through the so-called first connections of the microswitches for the group of functions to be coded by pulses of the tone pair for the given dial digit or symbol. The OR gate for which a connection is thus broken produces an output signal which triggers one of pulse formers 40 (FIGS. 3A, 3B, and 3C). Triggered pulse former 40, which may conveniently be a Schmitt trigger device, amplifies and makes more precise the signal applied to it. The output signal of the triggered pulse former in turn activates one of the digit or symbol select devices 44 (FIGS. 3A, 3B, and 3C), which may be a bistable multivibrator. The activated multivibrator applies enabling signals by way of diodes 46 to the pair of AND gates 48 associated with the audio tone generators 50 (FIGS 3A and 3B) capable of generating the pair of audio tones used to signal the appropriate push-button telephone dial digit or symbol. Diodes 46 serve to isolate digit select devices 44 from one another by allowing current flow in only one direction. It should be noted that no audio tones are produced by tone generators 50 until additional drive or control signals, generated as described hereafter, are applied to the other terminals of enabled AND gates 48. Audio tone generators 50 may be any suitable audio oscillator circuits, for example, those found in an ordinary 12-button, push-button telephone instrument (see, for example, U. S. Pat. No. 3,184,554 issued to L. A. Meacham et al on May 18, 1965).

In addition to enabling AND gates 48, signals from select devices 44 may also be applied by way of diodes 92 (FIGS. 3A, 3B, and 3C) and bus 93 to keyboard lock device 94 (FIG. 3C). Keyboard lock 94 may be any of several types of mechanical or electrical inhibitors available on many electric typewriters to prevent or nullify the depression of a typewriter key while another key is depressed. By controlling keyboard lock 94 with signals from select devices 44, the depression of additional typewriter keys will be either prevented or ignored while the coding of a typewriter function is taking place. Alternatively, keyboard lock may be apparatus for disabling the keyboard microswitches or preventing their operation from having any effect on the coder. This may be accomplished by disconnecting the keyboard microswitches or by including blocking gates (not shown) in the output leads of those switches. A simple warning light 96 (FIG. 3C) located on the typewriter console and arranged to come on whenever a signal from one of select devices 44 is present on bus 93 may be used together with or in place of keyboard locking apparatus 94.

When the activated typewriter key reaches the bottom of its travel, the so-called second connection in the attached microswitch is made. This produces a signal on horizontal lead 71 (FIGS. 3A, 3B, and 3C) if the typed key is a number, on one of horizontal leads 37–1, 37–2, or 37–3 (FIGS. 3A through 3D) if the typed key is a letter, punctuation mark, or the like, or on horizontal lead 37–S (FIGS. 3C and 3D) in the special case that the alphabetic or numeric mode control keys have been activated.

In the case of a number, a signal on lead 71 triggers pulse former 72 (FIG. 3A), similar to pulse formers 40, which in turn triggers mark one-shot device 74 (FIG. 3A). Mark one-shot 74, which may be a monostable multivibrator, produces an output pulse applied by way of diode 76 (FIG. 3A) to the above-mentioned remaining input terminals of AND gates 48. This mark pulse is blocked by all of AND gates 48 with the exception of the two gates enabled as discussed above. These two enabled gates pass the mark pulse to the associated pair of audio tone generators 50 with the result that a short burst of two audio tones is produced. These two audio tones are those required to signal the typed digit. The duration of the mark pulse produced by mark one-shot 74 must be sufficient to allow recognition of the resulting audio tones by whatever decoding apparatus is employed. It has been found that the decoding apparatus described later in this specification will operate satisfactorily with pulses of about 30 milliseconds duration.

The output signal of mark one-shot device 74 is also applied to space one-shot device 78 (FIG. 3A). This device, which serves to delay the output of mark one-shot 74, may be any suitable monostable multivibrator or delay network. The delay introduced by space one-shot device 78 must be long enough to allow completion of the coding of the number to be sent (i.e., the generation of the audio tone pulse produced as above). After this delay, space one-shot device 78 triggers reset pulse former 80 (similar to pulse former 72) which produces a pulse used to reset all of bistable digit or symbol select devices 44. Any such resetting of select devices 44 also serves to release keyboard lock device 94 if such apparatus has been included. The system is thereby made ready to encode the next typewriter function activated.

If a letter, punctuation mark, or other alphabetic mode typewriter function is to be sent, a signal is produced on one of leads 37–1, 37–2, or 37–3 when the typed key reaches the bottom of its travel and the second connection, so-called, is made in the attached microswitch. The lead on which the signal appears depends on how many pulses, not counting the end-of-code pulse, are required to code the desired function. The microswitches for functions requiring one pulse are connected to lead 37–1, those requiring two pulses are connected to lead 37–2, and those requiring three pulses are connected to lead 37–3. Pulse formers 54 (similar to pulse former 72), mark one-shot devices 56 (similar to one-shot device 74), and space one-shot devices 58 (similar to one-shot device 78), all shown in FIG. 3D, comprise a cascade of units for producing one, two, or three mark pulses separated by short time intervals. These mark pulses are applied by way of diodes 62 (FIG. 3D) to AND gates 48 with the result that one, two, or three short bursts of the pair of audio tones for the appropriate digit or symbol are generated by two of audio tone generators 50. The number of mark pulses produced by this apparatus depends on which of pulse formers 54 is used to trigger this portion of the apparatus and that in turn depends on which of leads 37 the initial signal appeared. If, for example, the typed key is one for which the second microswitch connection is connected to lead 37–3, pulse former 54–3 will be activated. This will set off a chain reaction in which all three of mark one-shot devices 56 are triggered. If, on the other hand, the typed key is one which results in a signal on lead 37–2, pulse former 54–2 will be activated. This will set off a shorter chain reaction not including the activation of pulse former 54–3, mark one-shot 56–3, or space one-shot 58–3. Accordingly, only two mark pulses will be generated. Similarly, an initiating signal on lead 37–1 will result in only one mark pulse being generated as the result of the activation of pulse former 54–1, mark one-shot 56–1, and space one-shot 58–1 only.

Figure 3D:
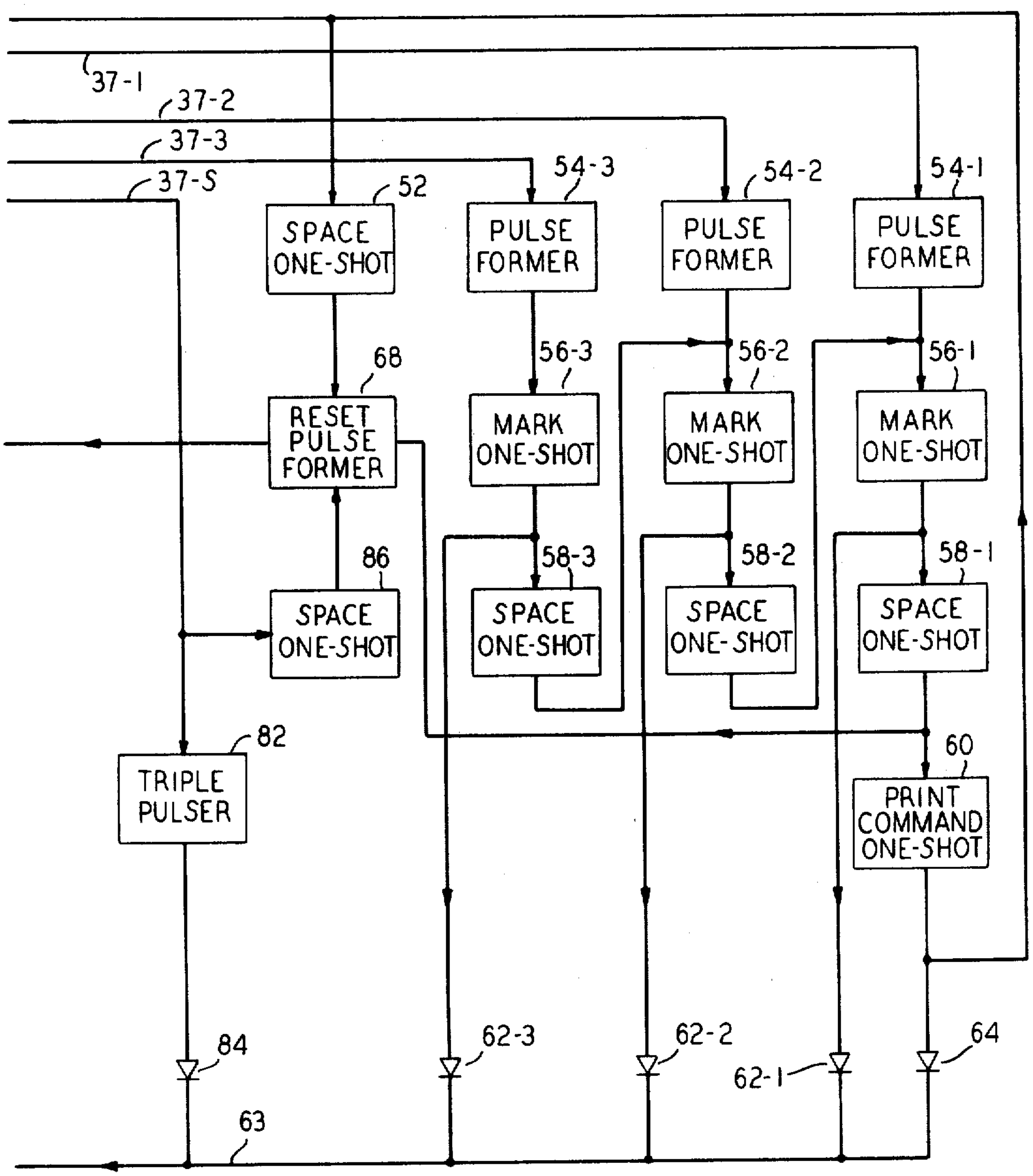
Figure 3E:
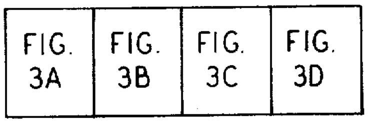

When the last of these one, two, or three mark pulses has been generated (in all cases by mark one-shot device 56–1), a reset pulse for resetting digit or symbol select devices 44 is generated by reset pulse former 68 (similar to reset pulse former 80) shown in FIG. 3D. Immediately thereafter, print command one-shot device 60 (similar to mark one-shot 56), also shown in FIG. 3D, is triggered. This device generates a final mark pulse which both activates digit 0 select device 44–0 and (as a result of the enabling of AND gates 48–4 and 48–6 by signals from device 44–0) pulses audio tone generators 50–4 and 50–6 once. The resulting burst of the audio tones for digit 0 is used at the decoder as an "end-of-code" or "print" signal.

Finally and after a short delay introduced by space one-shot device 52 (similar to previously described space one-shot devices), shown in FIG. 3D, reset pulse former 68 is again triggered and digit and symbol select devices 44 are reset. The apparatus is thereby made ready to encode another typewriter function.

As in the coding of numeric information, mark pulses of 30 milliseconds duration spaced apart by approximately 20 milliseconds have been found adequate for the satisfactory operation of the signal decoder described hereafter. Accordingly, the time constants of the mark and space one-shot devices discussed above must be chosen to produce mark and space pulses of these durations.

There are two remaining operations performed by the apparatus of FIGS. 3A through 3D. These are the automatic coding of the alphabetic and numeric mode control signals. As shown in FIG. 2, the alphabetic mode is signalled by three bursts of the audio tones for the telephone dial symbol *. The numeric mode is signalled by three bursts of the audio tones for the symbol #. These special codes may therefore be generated in very much the same way that alphabetic mode functions are coded. No final pulse of the digit 0 tones is, however, required. Accordingly, while the appropriate gates 48 are enabled in the manner discussed above, a separate triple pulser 82 (FIG. 3D), responsive to signals on lead 37–S, is provided for generating three sequential mark pulses as is required to code these special control functions. Triple pulser 82 may be a cascade of mark and space one-shots similar to the arrangement of mark one-shots 56 and space one-shots 58. Space one-shot device 86 (FIG. 3D) is a delay unit which produces an output signal for triggering reset pulse former 68 after time sufficient for the operation of triple pulser 82. Accordingly, space one-shot 86 may be similar to previously described space one-shot devices. The triggering of reset pulse former 68 resets the symbol select units 44, thereby readying the encoder of FIGS. 3A through 3D for its next coding operation.

To summarize, the automatic encoder of FIGS. 3A through 3D comprises apparatus for performing two functions in response to signals from typewriter keyboard microswitches. When any key is initially depressed, a pair of audio tone generators for generating tones associated with a given push-button dial digit or symbol is selected. When the typewriter key is fully depressed, a sequence of drive or control pulses appropriate to the coding of the typed function is applied to the selected pair of tone generators. Thereafter, the tone generator selecting apparatus is reset. In the case of alphabetic character coding, the encoder performs an additional selection and pulsing of the tone generators for an end-of-code signal. The encoder then performs a second reset operation. When finally reset, the encoder is ready to code the next typewriter function activated.

As an example of the foregoing, consider the encoding of the number 2 and the letters A, B, and C. All of the characters in this group are associated with the 2-button on the standard push-button telephone. As shown in FIG. 2, they are all therefore coded primarily by pulses of the audio tones for digit 2. In normal operation the ALPHA key is depressed before sending alphabetic information. Likewise, the NUM key is operated before numeric information is sent. As will be discussed below, these commands put the decoding apparatus in the appropriate decoding mode. The initial depression of the typewriter keys for any of characters 2, A, B, or C causes OR gate 38–2 (FIG. 3A) to produce an output signal. This signal triggers pulse former 40–2 (FIG. 3A) which changes the state of bistable digit 2 select unit 44–2 (FIG. 3A). This change in state of unit 44–2 results in the application of gate enabling signals to AND gates 48–1 and 48–6 (FIGS. 3A and 3B).

If the typewriter key for the numeral 2 is the key operated, a signal appears on lead 71 when that key reaches the bottom of its travel. This signal triggers pulse former 72 (FIG. 3A) which activates mark one-shot device 74 (FIG. 3A). Mark one-shot 74 produces a single mark pulse applied to audio tone generators 50–1 and 50–6 (FIGS. 3A and 3B) by way of enabled AND gates 48–1 and 48–6. The result is a single pulse of the audio tones for digit 2 applied to line 51, as is required to encode the number 2. Thereafter, a reset pulse is generated by reset pulse former 80 (FIG. 3A). Responsive to this pulse, bistable digit 2 select unit 44–2 is reset.

If, on the other hand, the typewriter key for the letter A is the key operated, a signal appears on lead 37–1 when the A-key reaches the bottom of its travel. This signal activates pulse former 54–1, mark one-shot device 56–1, space one-shot device 58–1, and reset pulse former 68, all shown in FIG. 3D, in very much the same way comparable units 72, 74, 78, and 80 are activated by a signal on lead 71 when numeral 2 is typed. The result is a single pulse of the audio tones for digit 2 followed by the resetting of bistable digit 2 select device 44–2. In addition, a pulse of the audio tones for digit 0 must follow the pulse of digit 2 tones when the letter A is encoded. This is accomplished by the activation of print command one-shot device 60 and other devices as described in detail above. The encoder is thereafter again reset.

If the typewriter key operated was the key for the letters B or C, the operations taking place following the bottoming of the key are similar to those taking place when A is typed. The major difference is that multiple digit 2 mark pulses must be generated. In the case of letter B, a signal is produced on lead 37–2 when the typewriter key bottoms. This triggers pulse former 54–2 which sets off the cascaded activation of devices 56–2, 58–2, 56–1, and 58–1 whereby two sequential digit 2 mark pulses are generated. In the case of letter C, a signal is produced on lead 37–3, thereby triggering pulse former 54–3. This activates devices 56–3 and 58–3 in addition to the devices activated when letter B is encoded. Accordingly, three sequential digit 2 mark pulses are generated. In each case the required pulses of digit 2 are followed by a single digit 0 mark pulse as in the case when letter A is encoded.

Figure 4A:
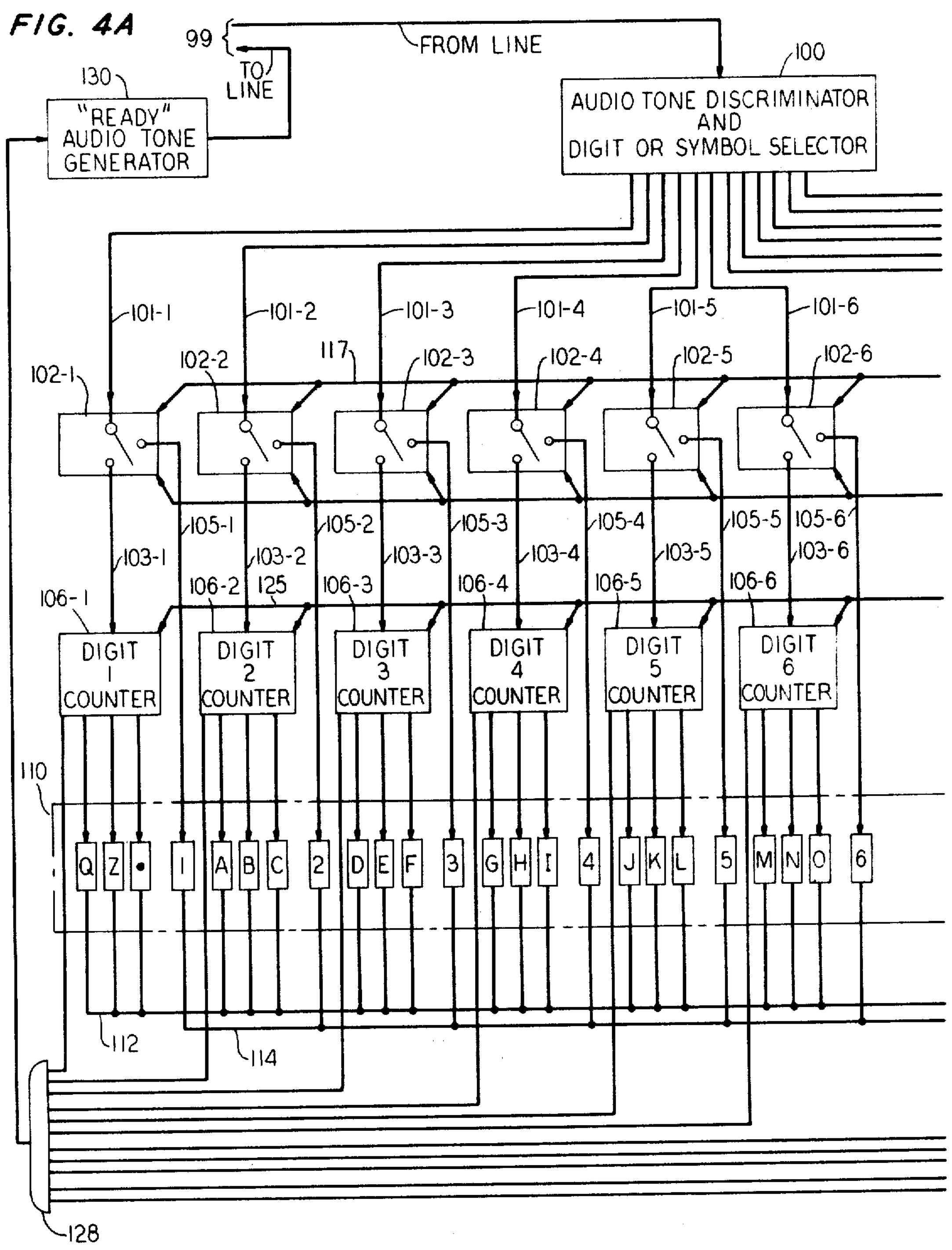
FIGS. 4A and 4B, which are to be read together as shown in FIG. 4C, comprise a schematic diagram of the automatic decoding apparatus of this invention.
Figure 4C:
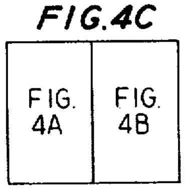
Figure 4B:
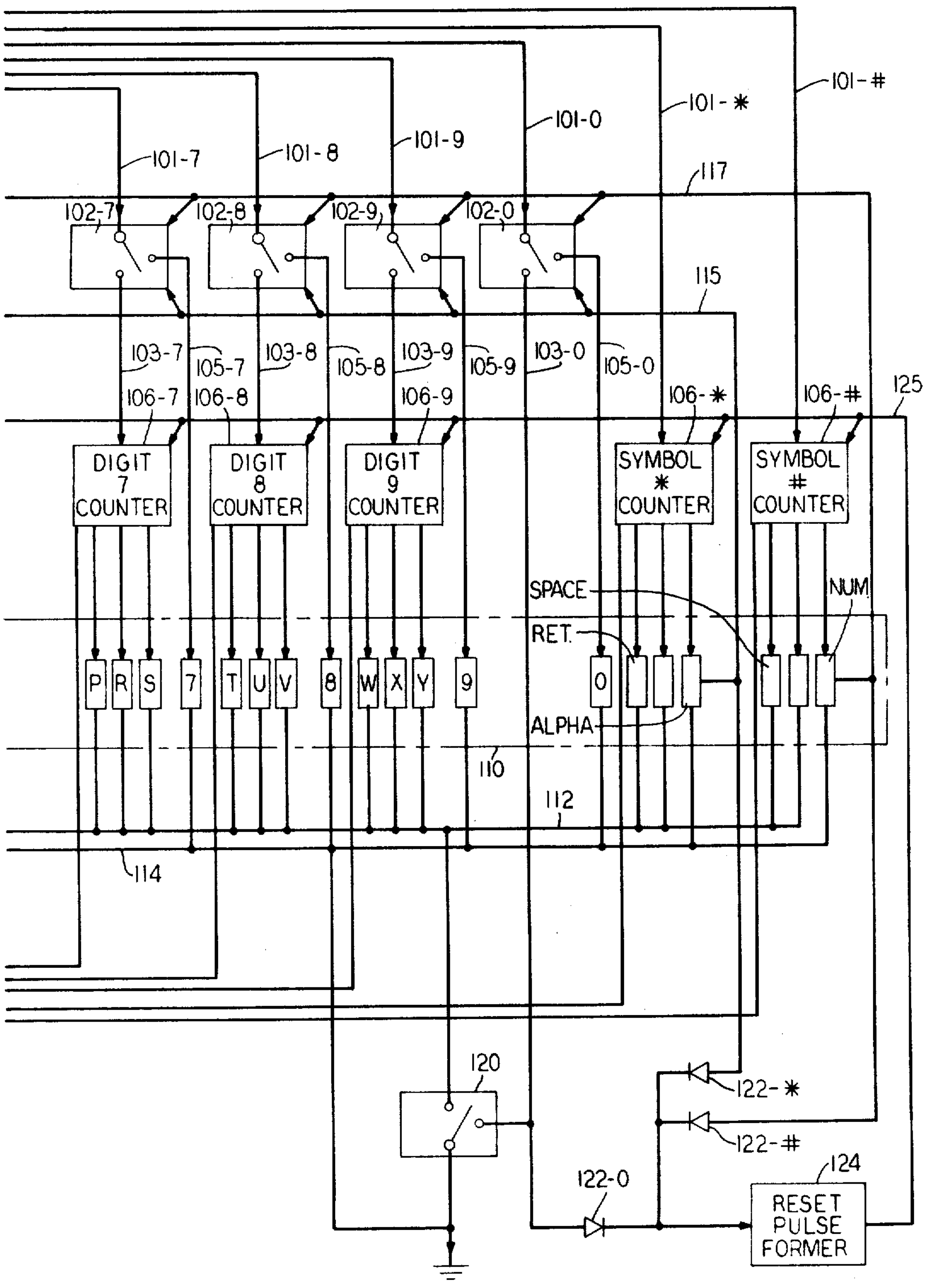

Since manual decoding of information transmitted by means of the above scheme would be inconvenient if not impossible, FIGS. 4A and 4B illustrate apparatus (designated signal decoder 26 in FIG. 1) designed to perform this task automatically.

In order to interpret information transmitted as above, it is first necessary to identify the audio tones received and to further identify the telephone dial digit or symbol represented by any pair of tones thus identified. These functions are performed in the decoder of FIGS. 4A and 4B by audio tone discriminator and digit or symbol selector 100 (FIG. 4A). Responsive to each burst of audio frequency energy received on line 99, this apparatus produces an output pulse directed to the one of switches 102 associated with the dial digit sent, or, if either symbol * or # was transmitted, to either counter 106–* or 106–# (FIG. 4B). Accordingly, apparatus 100 may be similar to the telephone central office equipment used to identify the audio tones and hence the digits of a telephone number dialed by a subscriber with a push-button telephone station set. Apparatus suitable for this purpose is described in U. S. Pat. No. 3,076,059, issued to L. A. Meacham on Jan. 29, 1963.

As will be discussed in greater detail below, the decoder of FIGS. 4A and 4B has two stable modes determined by the positions of bistable switches 102. When bistable switches 102 are positioned to connect leads 101 to leads 103, the decoder is in the mode required for the decoding of alphabetic information. When bistable switches 102 are positioned to connect leads 101 to leads 105, the decoder is in the mode required for the decoding of numeric information. If a dial digit (rather than one of dial symbols * and # ) is detected by apparatus 100 and if the decoder is in its numeric mode, an output signal from apparatus 100 is applied by way of one of leads 101 to the apparatus represented by the small solid rectangle enclosed by broken line 110 denoted by the digit detected.

If the decoder of FIGS. 4A and 4B is connected to a visual display device other than a typewriter (e.g., character displaying light tubes or bulbs) as may be the case with stations like station 14 of FIG. 1, the small solid rectangles enclosed by broken line 110 represent that portion of that visual display apparatus devoted to displaying the character in the rectangle. Accordingly, the two leads to each rectangle provide input and output paths for the current which must pass through the visual display device in order to activate display of the indicated character. If, on the other hand, the decoder of FIGS. 4A and 4B is connected to a typewriter as in the case of stations 10 and 12 of FIG. 1, the solid rectangles enclosed by broken line 110 may represent solenoids arranged to activate the functions of the receiving typewriter. This may be accomplished either by arranging the solenoids to depress the typewriter keys or by otherwise attaching the solenoids to the mechanism of the typewriter keys. In the case of either the character displaying light tubes or the typewriter, broken line 110 represents the visual display device employed at the receiving station. For convenience in further discussion, it will be assumed that the visual display device 110 is a modified typewriter and that the solid rectangles represent solenoids, each arranged to depress a typewriter key when a current is passed through it.

Since the solenoids for activating the numeric characters of receiving typewriter 110 are connected directly to ground by way of bus 114, a signal applied to any of those solenoids as mentioned above activates that solenoid immediately. The result is the typing of the number associated with the typewriter key depressed by the activated solenoid.

If the receiver is in the alphabetic mode, bistable switches 102 are positioned to connect leads 101 to leads 103. In that event, a pulse from audio tone discriminator 100 indicating that one of dial digits 1 through 9 has been received is directed to the digit counter 106 for that digit. Counters 106 may be any four level counting circuits. When all of counters 106 are in their initial conditions indicating that no decoding is taking place, the leftmost output lead of each counter is energized or made live. This results in a signal at the output terminal of AND gate 128 which activates audio tone generator 130, both shown in FIG. 4A. Audio tone generator 130 therefore produces an audio tone applied to line 99 whenever the decoder is ready to receive information. That tone is interrupted while any decoding operation is taking place, that is, while any of the counters 106 is holding a count other than zero. Since, as will be discussed, all of counters 106 are restored to their initial conditions after each decoding operation, this "ready" tone will be audible to the sender after each function he transmits is decoded. The sender, particularly one using a push-button telephone set as a coding device, is thereby assured that information transmitted is being properly decoded. Tone generator 130 may therefore be apparatus similar to any of audio tone generators 50 of FIGS. 3A and 3B but should, of course, produce a tone other than any of those used for coding purposes.

When a pulse from audio tone discriminator 100 is applied to any one of digit counters 106–1 through 106–9, the leftmost output lead of that counter is de-energized and the next leftmost output lead of that counter is made live. As discussed above, this interrupts the operation of audio tone generator 130 and energizes one of the two leads on one of the solenoids enclosed by broken line 110. Since switch 120 (FIG. 4B) is normally open, however, no solenoid activity takes place at this time. Should a second or third pulse be subsequently applied to that same digit counter, the second output lead of that counter will be returned to ground potential and the third or fourth output terminal, respectively, activated. The receipt of a pulse of the audio tones for digit 0 causes a pulse, generated by apparatus 100, to appear on lead 101–0 and hence on lead 103–0. Responsive to that pulse on lead 103–0, switch 120 momentarily closes, thereby connecting bus 112 to ground. The solenoid thus connected between a live digit counter output terminal and ground is activated and the attached typewriter key operated. The above-mentioned pulse on lead 103–0 also triggers reset pulse former 124 (FIG. 4B) by way of diode 122–0. Reset pulse former 124, similar to reset pulse formers discussed in connection with the coder of FIGS. 3A through 3D, generates a pulse, applied to bus 125, for resetting digit counters 106. The decoder of FIGS. 4A and 4B is thereby made ready to perform another decoding operation.

Switches like switches 106 are not needed in the connections between apparatus 100 and counters 106–* and 106–# because in the coding scheme shown in FIG. 2 pulses of those symbols have no distinct meaning in the numeric mode. Special consideration must, however, be given the fourth output lead of symbol counters 106–* and 106–# whereby the mode of the decoder is controlled. Since an end-of-code digit 0 pulse is not required in the coding of alphabetic and numeric mode control commands, devices ALPHA and NUM (FIG. 4B) connected to the fourth level output lead of counters 106–* and 106–#, respectively, must operate without waiting for a digit 0 pulse. Accordingly, they are connected directly to ground so that, as soon as the counters to which they are connected reach their fourth level, devices ALPHA and NUM are activated.

Exceptions to the rule that the devices enclosed by broken line 110 are solenoids, character displaying light tubes, or the like, devices ALPHA and NUM may be relays which when activated apply signals to buses 115 and 117, respectively. A pulse on bus 115 is used to set bistable switches 102 to connect leads 101 to leads 103. The decoder is thereby put in alphabetic mode. A pulse on bus 117, on the other hand, sets bistable switches 102 to connect leads 101 to leads 105 and thus puts the decoder in the numeric mode. Since switches 102 are bistable, the decoder stays in whatever mode is established until a new mode control command is received. A signal on either of buses 115 or 117 also triggers reset pulse former 124 by means of which a signal is generated to reset counters 106.

It is to be observed that as long as the audio tone pulses received by the decoder of FIGS. 4A and 4B are of sufficient duration to allow apparatus 100 to identify them (i.e., approximately 30 milliseconds), the timing of the pulses is not material. The decoder simply counts the pulses and acts on them either automatically (in the case of numerals and mode control commands) or when instructed to by a separate end-of-code command (in the case of alphabetic mode operation). Accordingly, there is no need for synchronization of the sending and receiving apparatus. Moreover, since timing is immaterial, the decoder of FIGS. 4A and 4B can be used to interpret messages transmitted from either automatic encoders like the device shown in FIGS. 3A through 3D or from an ordinary, manually operated, 12-button telephone dial. The inevitable irregularity of pulses from a coder of the latter type is not obstacle to the satisfactory operation of this decoder.

Figure 5:
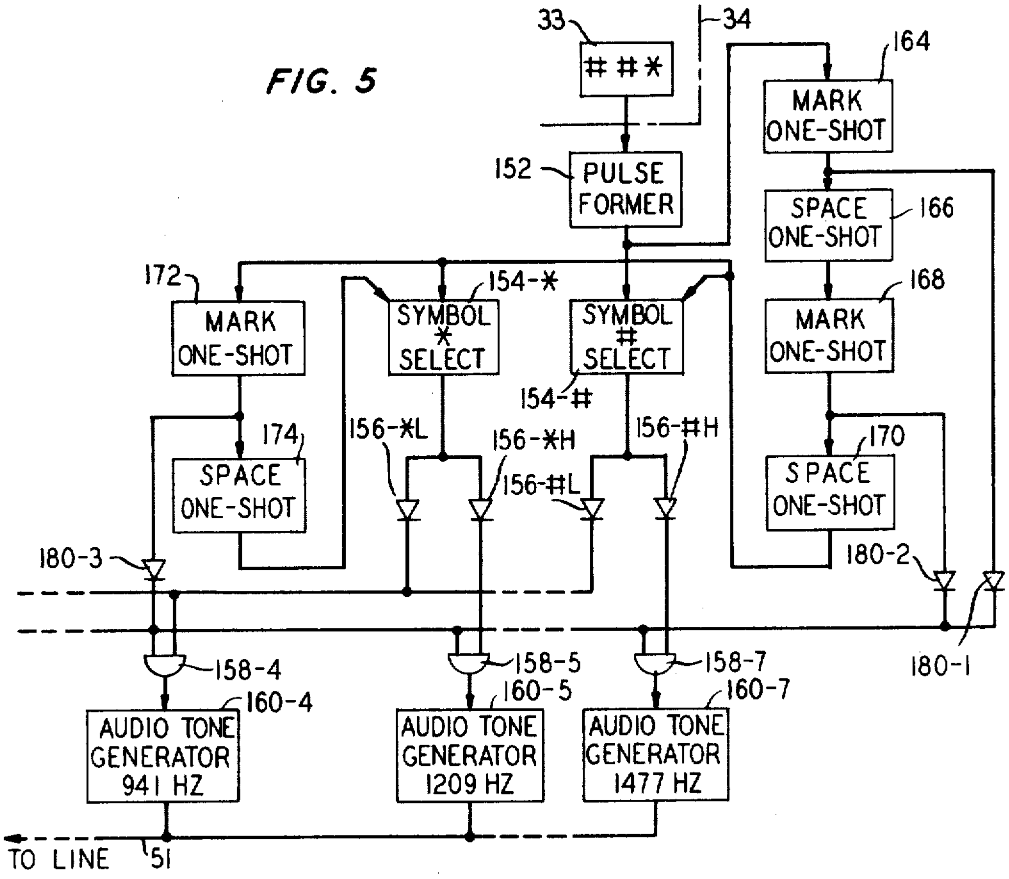
FIG. 5 is a schematic diagram showing how the apparatus of FIG. 3 may be modified to generate a coding sequence different in kind from those generated by the apparatus of FIG. 3.
Figure 6:
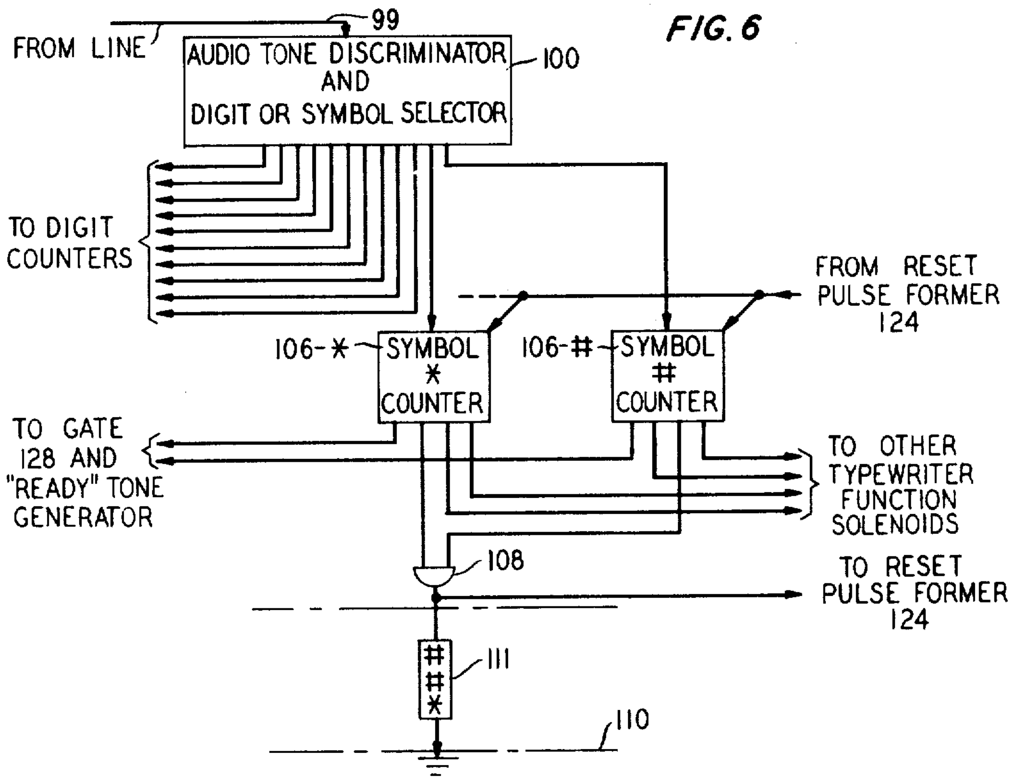
FIG. 6 is a schematic diagram showing how the apparatus of FIG. 4 may be modified to decode the coding sequence generated by the apparatus of FIG. 5.

It is to be understood that the embodiments shown and described herein are illustrative of the principles of this invention only, and that modifications may be implemented by those skilled in the art without departing from the spirit and scope of the invention. For example, other coding schemes may be used, particularly for functions which are not marked on the telephone dial. In particular, it may be desirable to extend the number of codes available for special characters, punctuation marks, and the like regardless of the mode the decoder is in. In the coding scheme of FIG. 2 only the mode control codes may be recognized regardless of the mode of the decoder. One way of extending the number of such codes is to provide for more complicated sequences of pulses of the audio tones for dial symbols * and # . FIGS. 5 and 6 illustrate how one such sequence of pulses may be automatically coded and decoded, respectively, by additions to or modifications of the apparatus shown in FIGS. 3A through 3D and FIGS. 4A and 4B. The sequence ## *, which may be used to code any teletypewriter function needed with both alphabetic and numeric information, may be coded as shown in FIG. 5 by attaching a microswitch to the key 33 of the sending typewriter 34 for the function to be coded by this pulse sequence. This microswitch attachment may be made in the manner described above in the discussion of the apparatus of FIGS. 3A through 3D. The microswitch attached to key 33, however, need be arranged to make only one connection, rather than two as is required for the microswitches of FIGS. 3A through 3C. The operation of key 33 operates the attached microswitch which triggers pulse former 152. Pulse former 152, similar to pulse formers 40 of FIGS. 3A through 3C, generates a pulse which activates bistable symbol # select unit 154–# . Symbol # select unit 154–# , which may be similar to digit and symbol select units 44 of FIGS. 3A through 3C, applies gate enabling signals by way of diodes 156–#L and 156–#H to AND gates 158–4 and 158–7. Gates 158–4 and 158–7 are thereby enabled until symbol # select unit 154–# is reset as discussed below. The pulse generated by pulse former 152 is also applied to mark one-shot device 164. Mark one-shot 164, which may be similar to mark one-shot 74 of FIG. 3A, generates a pulse of approximately 30 milliseconds duration which is applied to audio tone generators 160–4 and 160–7 by way of diode 180–1 and enabled AND gates 158–4 and 158–7. This results in the application to line 51 of a pulse of the audio tones representative of push-button telephone dial symbol # . Audio tone generators 160 may therefore be similar to audio tone generators 50 of FIGS. 3A and 3B.

The output signal of mark one-shot device 164 is also applied to space one-shot device 166 which produces an output signal after the completion of the mark pulse from mark one-shot 164 and after a suitable delay. Space one-shot device 166 may therefore be similar to space one-shot devices 58 of FIG. 3D. Responsive to the output signal of space one-shot device 166, mark and space one-shot devices 168 and 170 repeat the sequence of operations performed by mark and space one-shot devices 164 and 166. Mark and space one-shot devices 168 and 170 may therefore be similar to mark and space one-shot devices 164 and 166, respectively. A second mark pulse is thereby generated and applied by way of diode 180–2 and enabled AND gates 158–4 and 158–7 to audio tone generators 160–4 and 160–7. Accordingly, audio tone generators 160–4 and 160–7 produce a second pulse, applied to line 51, of the audio tones representative of push-button telephone symbol .

Thereafter, bistable symbol # select unit 154– # is reset by the output signal of space one-shot device 170. This same signal also activates bistable symbol * select unit 154–* and triggers mark one-shot device 172. Bistable symbol * select device 154–* enables AND gates 158–4 and 158–5. Symbol * select device 154–* may therefore be similar to device 154– # . Mark one-shot device 172, similar to mark one-shot devices 164 and 168, produces a mark pulse similar to those produced by mark one-shots 164 and 168. This mark pulse is applied to audio tone generators 160–4 and 160–5 by way of diode 180–3 and enabled AND gates 158–4 and 158–5 with the result that a pulse of the audio tones representative of push-button telephone symbol * is applied to line 51. The coding of the sequences ## * being thus completed, it remains only to reset symbol * select device 154–*. This is accomplished by a signal from space one-shot device 174. Accordingly, space one-shot 174 may be similar to previously described space one-shot devices 166 and 170.

FIG. 6 shows how the apparatus of FIGS. 4A and 4B may be modified to decode the sequence generated by the apparatus of FIG. 5. The operation of audio tone discriminator and digit or symbol select apparatus 100 and of counters 106 is identical to the operation of like apparatus discussed above in connection with FIGS. 4A and 4B. Accordingly, when two pulses of the audio tones for symbol # are detected, symbol # counter 106–# applies a gate enabling signal to AND gate 108. When, thereafter, a single pulse of the audio tones for symbol * is detected, the output signal level change on the next to leftmost output lead of symbol * counter 106–* is passed to solenoid 111 attached to the appropriate function mechanism of receiving typewriter 110. Solenoid 111 is thereby activated causing the desired function of receiving typewriter 110 to operate. Counters 106 are thereafter reset by reset pulse former 124.

What is claimed is:

1. A teletypewriter sending station for coding typewriter functions into a code in which each of said typewriter functions is represented by a predetermined number of pulses of audio frequency electrical signals followed in time by an end-of-sequence signal consisting of a pulse of some other audio frequency signals, comprising:

a plurality of audio frequency electrical signal generators;

a typewriter having typewriter functions each of which is activated by the operation of one of a plurality of typewriter keys;

a plurality of electrical switches each mechanically attached to one of said plurality of typewriter keys and arranged to operate when said attached key is operated;

first audio frequency selecting means responsive to the operation of any of said electrical switches for selecting from said plurality of audio frequency signal generators those for generating the audio frequencies representative of the typewriter function activated by the typewriter key attached to said switch;

first drive pulse generating means responsive to said operation of said switch for generating a predetermined number of drive pulses representative of said typewriter function activated by said typewriter key attached to said switch;

means for applying said drive pulses to said audio frequency signal generators selected by said first audio frequency selecting means;

second audio frequency selecting means responsive to the last of said predetermined number of drive pulses for selecting from said plurality of audio frequency signal generators those for generating the audio frequencies representative of said end-of-sequence signal;

second drive pulse generating means responsive to said last of said predetermined number of drive pulses for generating an end-of-sequence drive pulse; and means for applying said end-of-sequence drive pulse to said audio frequency signal generators selected by said second audio frequency selecting means.

2. A teletypewriter sending station as defined in claim 1 further comprising:

keyboard locking means responsive to the operation of any of said electrical switches for mechanically preventing the operation of said typewriter keys while said keyboard locking means is activated; and means responsive to the last of said predetermined number of drive pulses for resetting said keyboard locking means.

3. A teletypewriter sending station as defined in claim 1 further comprising:

keyboard deactivating means responsive to the operation of any of said electrical switches for disconnecting said electrical switches to prevent the operation of any other of said switches from having any effect on the coding apparatus; and means responsive to the last of said predetermined number of drive pulses for resetting said keyboard deactivating means.

4. A teletypewriter receiving station for performing typewriter functions in response to commands transmitted from a sending station by means of a code in which groups of one or more typewriter functions are represented by pulses of audio frequency electrical signals, each of said functions in any of said groups being represented by a sequence of a predetermined number of said pulses of the audio frequency signals for that group followed in time by an end-of-sequence signal consisting of a pulse of some other audio frequency signals, comprising:

a typewriter;

audio frequency discriminating means for identifying the frequencies present in said pulses;

means for determining which of said groups of typewriter functions are represented by said identified frequencies;

counting means associated with each of said groups of functions for counting the number of pulses, other than said end-of-sequence pulse, in sequences of pulses representing functions in each of said groups; and means responsive to said end-of-sequence signals for activating the function of said typewriter indicated by the pulse count on any one of said counting means.

5. A teletypewriter receiving station as defined in claim 4, further comprising:

audio frequency electrical signal generating means for generating an audio frequency electrical signal indicative of the readiness of said receiving station to receive a sequence of coding pulses; and means responsive to the activation of any of said counting means for turning off said audio signal generating means.

6. A teletypewriter sending station for coding typewriter functions into a code in which each of said typewriter functions is represented by a predetermined number of pulses of audio frequency electrical signals followed in time by an end-of-sequence signal consisting of a pulse of some other audio frequency signals comprising:

a plurality of audio frequency electrical signal generators;

a typewriter having typewriter functions each of which is activated by the operation of one of a plurality of typewriter keys;

first audio frequency selecting means responsive to the operation of any of said typewriter keys for selecting from said plurality of audio frequency signal generators those for generating the audio frequencies representative of the typewriter function activated by said typewriter key;

first drive pulse generating means responsive to the operation of said typewriter key for generating a predetermined number of drive pulses representative of said typewriter function activated by said typewriter key;

means for applying said drive pulses to said audio frequency signal generators selected by said first audio frequency selecting means;

second audio frequency selecting means responsive to the last of said predetermined number of drive pulses for selecting from said plurality of audio frequency signal generators those for generating the audio frequencies representative of said end-of-sequence signal;

second drive pulse generating means responsive to the last of said predetermined number of drive pulses for generating an end-of-sequence drive pulse; and means for applying said end-of-sequence drive pulse to said audio frequency signal generators selected by said second audio frequency selecting means.

7. An alphanumeric telecommunications system for transmitting typewriter functions in a code in which groups of one or more typewriter functions are represented by pulses of audio frequency electrical signals, each of said functions in any of said groups being represented by a sequence of a predetermined number of said pulses of the audio frequency signals for that group followed in time by an end-of-sequence pulse of some other audio frequency signals, comprising:

a sending station including a push-button telephone station set for originating said audio frequency pulses;

a receiving station including a typewriter, audio frequency discriminating means for identifying the frequencies present in said pulses, means for determining which of said groups of typewriter functions is represented by said identified frequencies, counting means associated with each of said groups of functions and responsive to said means for determining for counting the number of pulses other than said end-of-sequence pulse in sequences of pulses representing functions in the groups identified by said means for determining, and means responsive to said end-of-sequence pulse for activating the function of said typewriter indicated by the pulse count on any of said counting means; and means for transmitting said audio frequency pulses from said sending station to said receiving station.

8. An alphanumeric telecommunications system as defined in claim 7 wherein said receiving station further includes audio frequency electrical signal generating means for generating an audio frequency electrical signal indicative of the readiness of said receiving station to receive a sequence of coding pulses and means responsive to the activation of any of said counting means for turning off said audio signal generating means.

9. An alphanumeric telecommunications system for transmitting alphanumeric character information in a code in which groups of one or more alphanumeric characters are represented by pulses of predetermined audio frequency electrical signals, each of said characters in any of said groups being represented by a sequence of a predetermined number of said pulses of the audio frequency signals for that group followed in time by an end-of-sequence pulse of some other audio frequency signals, comprising:

a sending station for originating said audio frequency pulses;

a receiving station including audio frequency discriminating means for identifying the group of characters represented by each sequence of pulses from the frequencies of the signals in said pulses, counting means for identifying the character in said group from the number of pulses in said sequence, and means responsive to said end-of-sequence pulse for visually displaying the identified character; and means for transmitting said audio frequency pulses from said sending station to said receiving station.

10. The alphanumeric telecommunications system defined in claim 9 wherein said sending station includes a push-button telephone station set for originating said audio frequency pulses.

11. The alphanumeric telecommunications system defined in claim 9 wherein said means for visually displaying includes at least one alphanumeric character display light tube.

* * * * *